United States Patent
Jezewski

(10) Patent No.: US 11,694,257 B2
(45) Date of Patent: *Jul. 4, 2023

(54) UTILIZING ARTIFICIAL INTELLIGENCE TO MAKE A PREDICTION ABOUT AN ENTITY BASED ON USER SENTIMENT AND TRANSACTION HISTORY

(71) Applicant: Capital One Services, LLC, McLean, VA (US)

(72) Inventor: Joni Bridget Jezewski, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 1019 days.

This patent is subject to a terminal disclaimer.

(21) Appl. No.: 16/516,506

(22) Filed: Jul. 19, 2019

(65) Prior Publication Data

US 2019/0340688 A1 Nov. 7, 2019

Related U.S. Application Data

(63) Continuation of application No. 15/896,953, filed on Feb. 14, 2018, now Pat. No. 10,360,631.

(51) Int. Cl.
*G06Q 40/06* (2012.01)
*G06Q 40/04* (2012.01)
*G06Q 30/0202* (2023.01)
*G06Q 50/00* (2012.01)
*G06Q 30/0201* (2023.01)

(52) U.S. Cl.
CPC ......... *G06Q 40/04* (2013.01); *G06Q 30/0201* (2013.01); *G06Q 30/0202* (2013.01); *G06Q 40/06* (2013.01); *G06Q 50/01* (2013.01)

(58) Field of Classification Search
CPC ........ G06Q 40/00; G06Q 40/04; G06Q 40/06; G06Q 30/00; G06Q 30/08
USPC ................................................. 705/35, 36 R
See application file for complete search history.

(56) References Cited

U.S. PATENT DOCUMENTS

| | | | |
|---|---|---|---|
| 6,266,668 | B1 | 7/2001 | Vanderveldt et al. |
| 7,072,863 | B1 | 7/2006 | Phillips et al. |
| 7,130,777 | B2 | 10/2006 | Garg et al. |

(Continued)

OTHER PUBLICATIONS

Cappe O., et al.,"Inference in Hidden Markov Models," May 2005, Springer, 28 pages.

(Continued)

*Primary Examiner* — Hani M Kazimi
(74) *Attorney, Agent, or Firm* — Harrity & Harrity, LLP

(57) ABSTRACT

A device receives comment information that is associated with users and includes comments provided by the users, about an entity, via social media sources, and receives transaction information that is associated with the users and includes financial transactions of the users with the entity. The device determines correlations between the comment information and the transaction information, where the correlations between the comment information and the transaction information provide weights to the comment information to generate weighted comment information. The device generates a prediction about a future stock price of the entity based on the weighted comment information, the transaction information, and the correlations between the comment information and the transaction information, and provides the prediction about the future stock price of the entity for display.

20 Claims, 11 Drawing Sheets

(56) References Cited

U.S. PATENT DOCUMENTS

| | | |
|---|---|---|
| 7,146,416 B1 | 12/2006 | Yoo et al. |
| 7,155,510 B1 | 12/2006 | Kaplan |
| 7,185,065 B1 | 2/2007 | Holtzman et al. |
| 7,299,204 B2 | 11/2007 | Peng et al. |
| 8,935,198 B1 | 1/2015 | Phillips et al. |
| 10,360,631 B1 | 7/2019 | Jezewski |
| 2009/0319342 A1 | 12/2009 | Shilman et al. |
| 2010/0179930 A1 | 7/2010 | Teller et al. |
| 2010/0257117 A1 | 10/2010 | Shvadron et al. |
| 2010/0299301 A1 | 11/2010 | Busch et al. |
| 2012/0226645 A1 | 9/2012 | O'Rourke |
| 2013/0138577 A1 | 5/2013 | Sisk et al. |
| 2014/0324752 A1 | 10/2014 | Statnikov et al. |
| 2019/0095805 A1 | 3/2019 | Tristan et al. |

OTHER PUBLICATIONS

Ding C., et al.,"K-means Clustering via Principal Component Analysis," Proceedings of the 21st International Conference on Machine Learning, Jul. 2004, pp. 225-232.

Sarwar B., et al., "Incremental Singular Value Decomposition Algorithms for Highly Scalable Recommender Systems," Fifth International Conference on Computer and Information Science, 2002, 6 pages.

Seymore K, et al., "Learning Hidden Markov Model Structure for Information Extraction", AAAI 99 Workshop on Machine Learning for Information Extraction, 1999, 6 pages.

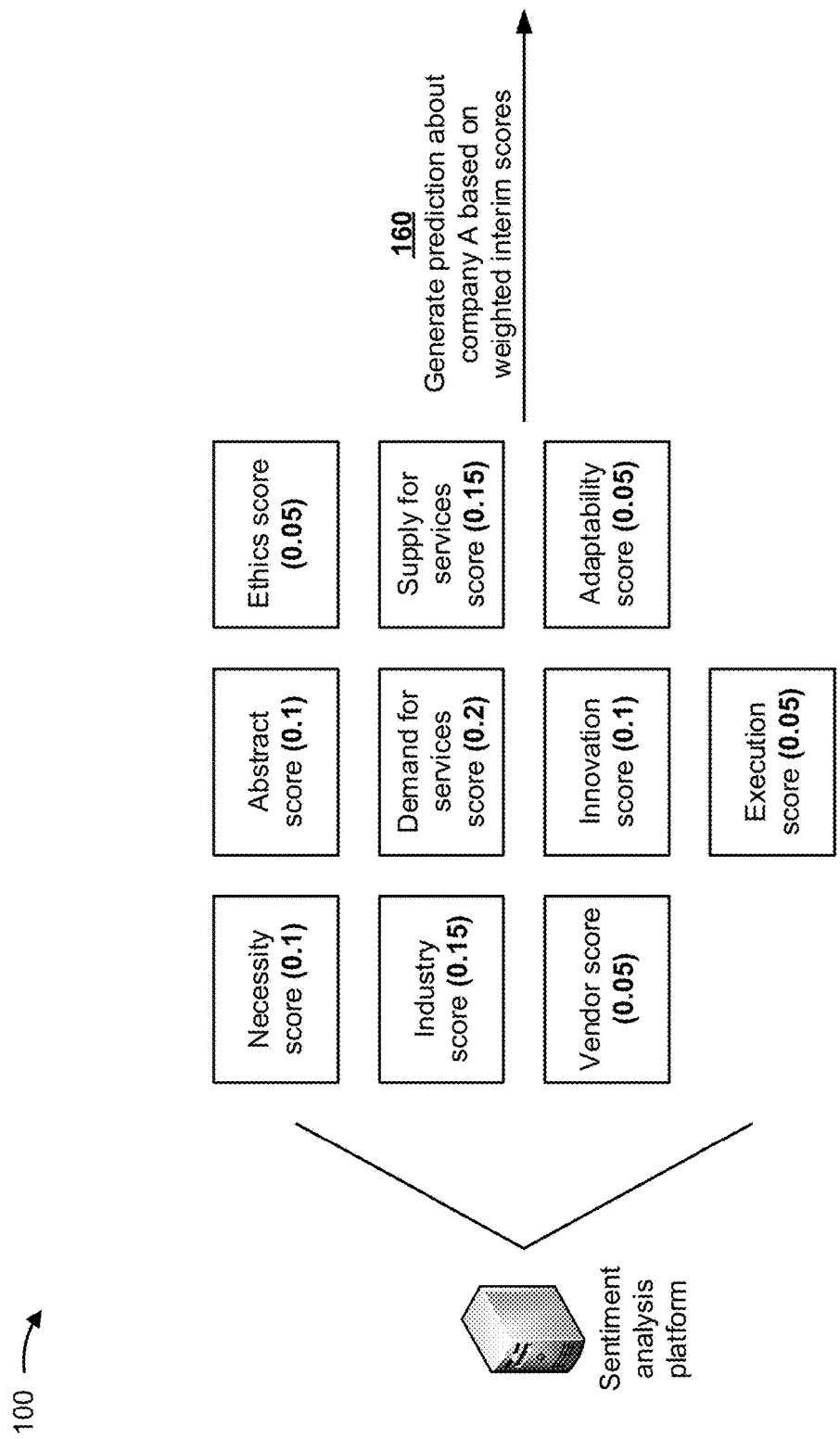

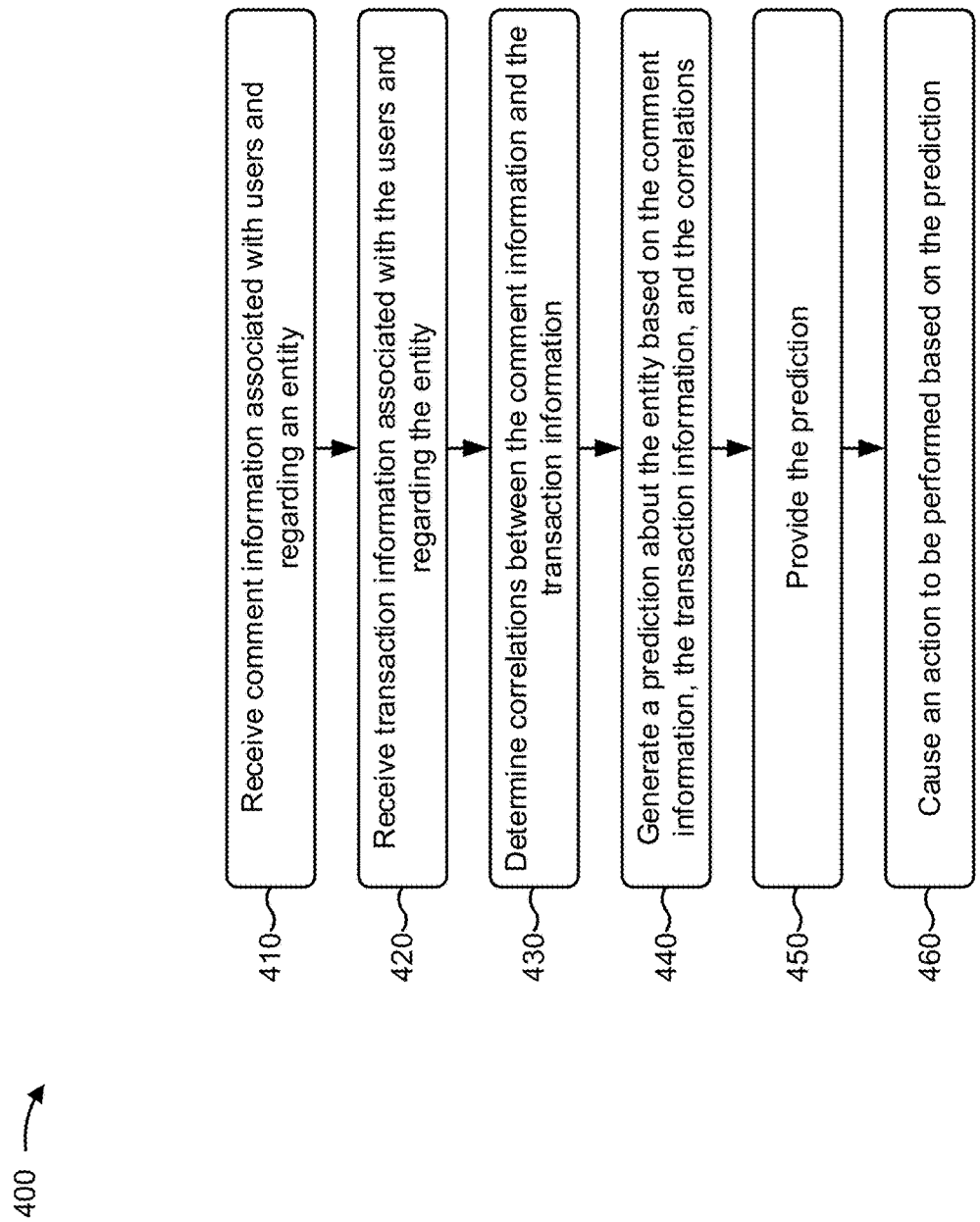

UTILIZING ARTIFICIAL INTELLIGENCE TO MAKE A PREDICTION ABOUT AN ENTITY BASED ON USER SENTIMENT AND TRANSACTION HISTORY

CROSS-REFERENCE TO RELATED APPLICATION UNDER 35 U.S.C. § 120

This application is a continuation of U.S. patent application Ser. No. 15/896,953, filed on Feb. 14, 2018 (now U.S. Pat. No. 10,360,631), entitled "UTILIZING ARTIFICIAL INTELLIGENCE TO MAKE A PREDICTION ABOUT AN ENTITY BASED ON USER SENTIMENT AND TRANSACTION HISTORY," the content of which is incorporated by reference herein in its entirety.

BACKGROUND

The Internet provides many platforms for users to exchange information, such as social media applications, blogs, chat rooms, Internet forums or message boards, ratings systems where users can provide remarks about an entity's products and/or services, and/or the like. The same users of such platforms also use the Internet to conduct online transactions with entities, such as online banking, online purchasing of products and/or services, and/or the like.

SUMMARY

According to some implementations, a device may include one or more memories, and one or more processors, communicatively coupled to the one or more memories, to receive comment information associated with multiple users, where the comment information may include comments provided by the multiple users, about an entity, via multiple social media sources. The one or more processors may receive transaction information associated with the multiple users, where the transaction information may include financial transactions of the multiple users with the entity, and may determine correlations between the comment information and the transaction information. The correlations between the comment information and the transaction information may provide multiple weights to the comment information, and the providing the multiple weights to the comment information may generate weighted comment information. The one or more processors may generate a prediction about a future stock price of the entity based on the weighted comment information, the transaction information, and the correlations between the comment information and the transaction information, and may provide the prediction about the future stock price of the entity for display.

According to some implementations, a method may include receiving, by a device, complaint information, opinion information, and prediction information associated with multiple users. The complaint information, the opinion information, and the prediction information may be received from multiple social media sources, and the complaint information, the opinion information, and the prediction information may relate to an entity. The method may include receiving, by the device, transaction information associated with the multiple users, where the transaction information may be received from multiple financial institutions or the multiple users, and the transaction information may relate to the entity. The method may include determining, by the device, correlations between the transaction information and the complaint information, the opinion information, and the prediction information, where the correlations between the transaction information and the complaint information, the opinion information, and the prediction information may provide multiple weights to the complaint information, the opinion information, and the prediction information. The method may include generating, by the device, a prediction about a future stock price of the entity based on the complaint information, the opinion information, the prediction information, the transaction information, and the correlations between the transaction information and the complaint information, the opinion information, and the prediction information, and providing, by the device, the prediction about the future stock price of the entity for display.

According to some implementations, a non-transitory computer-readable medium may store instructions that include one or more instructions that, when executed by one or more processors of a device, cause the one or more processors to receive historical information associated with an entity, and receive comment information associated with multiple users, where the comment information may relate to the entity. The one or more instructions may cause the one or more processors to receive transaction information associated with the plurality of users, where the transaction information may relate to the entity, and utilize artificial intelligence to calculate multiple scores for the entity based on the historical information and the comment information. The one or more instructions may cause the one or more processors to determine correlations between the multiple scores and the transaction information, and apply weights to the multiple scores, based on the correlations between the multiple scores and the transaction information, and to generate multiple weighted scores. The one or more instructions may cause the one or more processors to generate a prediction about a future stock price of the entity based on the multiple weighted scores, and provide the prediction about the future stock price of the entity for display.

BRIEF DESCRIPTION OF THE DRAWINGS

FIGS. 1A-1H are diagrams of an overview of an example implementation described herein;

FIG. 4 is a flow chart of an example process for utilizing artificial intelligence to make a prediction about an entity based on user sentiment and transaction history.

DETAILED DESCRIPTION

The following detailed description of example implementations refers to the accompanying drawings. The same reference numbers in different drawings may identify the same or similar elements.

Many software applications are available from brokerage firms and independent vendors that claim various functions to assist traders with predicting stock prices. Most brokerage firms offer stock trading software, that include a variety of trade, research, stock screening, and analysis functions, to individual clients when the clients open a brokerage account. Such stock trading software claim to provide built-in technical indicators, fundamental analysis numbers, integrated applications for trade automations, news, alert features, and/or the like. However, such stock trading software fails to consider sentiments of people who have opinions about entities (e.g., companies whose stocks are the subject of the software), and transactions conducted by people with the entities.

Some implementations described herein may provide a sentiment analysis platform that utilizes artificial intelligence to make a prediction about an entity based on user sentiment and transaction history. For example, the sentiment analysis platform may consider sentiments of users who have opinions, complaints, and predictions about the entity, and transactions conducted by users with the entities in order to predict a future stock price of the entity. The sentiment analysis platform may receive the opinions, the complaints, and the predictions of the users, about the entity, from social media sources, and may receive transaction information associated with the users and the entity from financial institutions. The sentiment analysis platform may determine correlations between the transaction information and the opinions, the complaints, and the predictions, in order to apply weights to the opinions, the complaints, and the predictions. The sentiment analysis platform may generate metrics that may provide a basis or factor for a prediction about the future stock price of the entity based on the opinions, the complaints, the predictions, the transaction information, and the correlations between the transaction information and the opinions, the complaints, and the predictions.

Figure 1A:
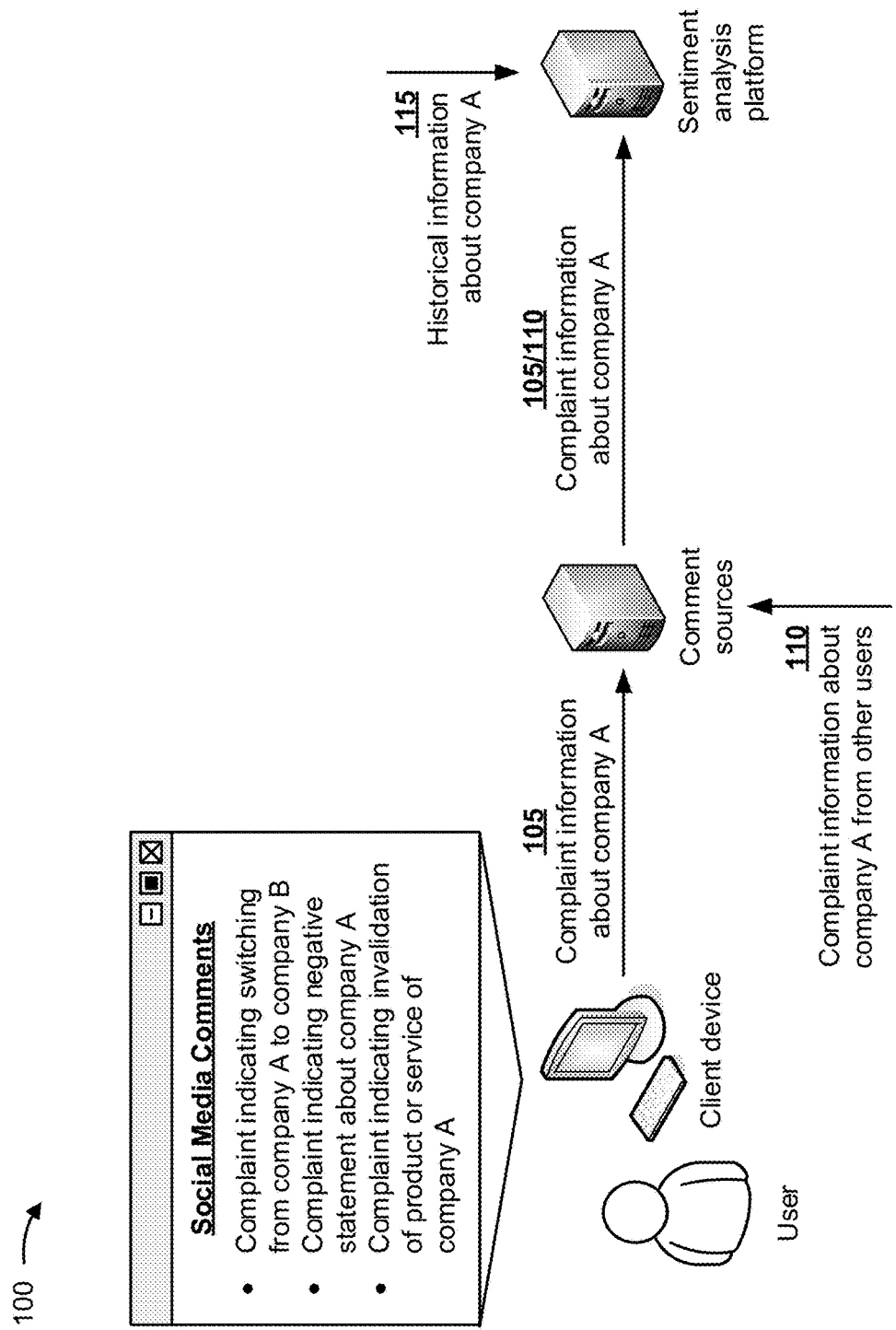

FIGS. 1A-1H are diagrams of an overview of an example implementation 100 described herein. As shown in FIG. 1A, example implementation 100 may include a client device, comment sources, and a sentiment analysis platform. Assume that a user utilizes the client device to access one or more applications provided by the comment sources. In some implementations, the comment sources may include sources that provide social media applications, blog applications, chat room applications, message board applications, ratings system applications, and/or the like. As further shown in FIG. 1A, the user may utilize the client device to provide complaint information, about an entity (e.g., company A), to the one or more applications provided by the comment sources. For example, the complaint information may include a complaint indicating that the user is switching from company A to company B, a complaint indicating a negative statement about company A, a complaint indicating invalidation of a product or service of company A, and/or the like.

In some implementations, an entity may include a company, a university, a government agency, and/or the like. The term company may be used primarily herein to refer to an entity, but the implementations described herein also apply to other types of entities. In some implementations, the complaint information may include a type of an opinion, such as switching from one company to another company that provides an equivalent product or service; a negative statement about a company, employees of the company, a brand of the company, or a product or a service offered by the company; a positive statement about competitors of the company, employees of the competitors, brands of the competitors, or products or services offered by the competitors; using a platform that automates or invalidates the products and/or services offered by the company (e.g., using a large online merchant to sell goods instead of creating a website may invalidate a website-creation company); and/or the like.

As further shown in FIG. 1A, and by reference number 105, when the user provides the complaint information about company A, the client device may provide the complaint information about company A to the comment sources, and the comment sources may receive the complaint information about company A. As further shown in FIG. 1A, and by reference number 110, the comment sources may receive complaint information about company A from other users. For example, the other users may utilize the one or more applications provided by the comment sources to provide the complaint information about company A to the comment sources. In some implementations, the complaint information about company A, provided by the other users, may be similar to the complaint information, described above and provided by the user to the comment sources.

As further shown in FIG. 1A, and by reference numbers 105 and 110, the comment sources may provide the complaint information about company A (e.g., received from the user and the other users) to the sentiment analysis platform. In some implementations, the sentiment analysis platform may receive the complaint information about company A, and may store the complaint information about company A. In some implementations, the sentiment analysis platform may scrape the complaint information about company A from public forums, such as a website associated with company A, blogs about company A, consumer websites, blogs about an industry associated with company A, websites offering for sale products and/or services of company A, and/or the like.

As further shown in FIG. 1A, and by reference number 115, the sentiment analysis platform may receive historical information about company A (e.g., from third party financial sources that provide historical information, such as historical financial information about companies). In some implementations, the sentiment analysis platform may receive the historical information about company A, and may store the historical information about company A. In some implementations, the historical information about company A may include information indicating a financial health of company A, products offered by company A, services offered by company A, brands associated with company A, competitors of company A, financial health of the competitors, products offered by the competitors, services offered by the competitors, brands associated with the competitors, correlations between user opinions and historical stock prices (or other valuations) of company A, sentiment correlations with the historical stock prices of company A, and/or the like.

Figure 1B:
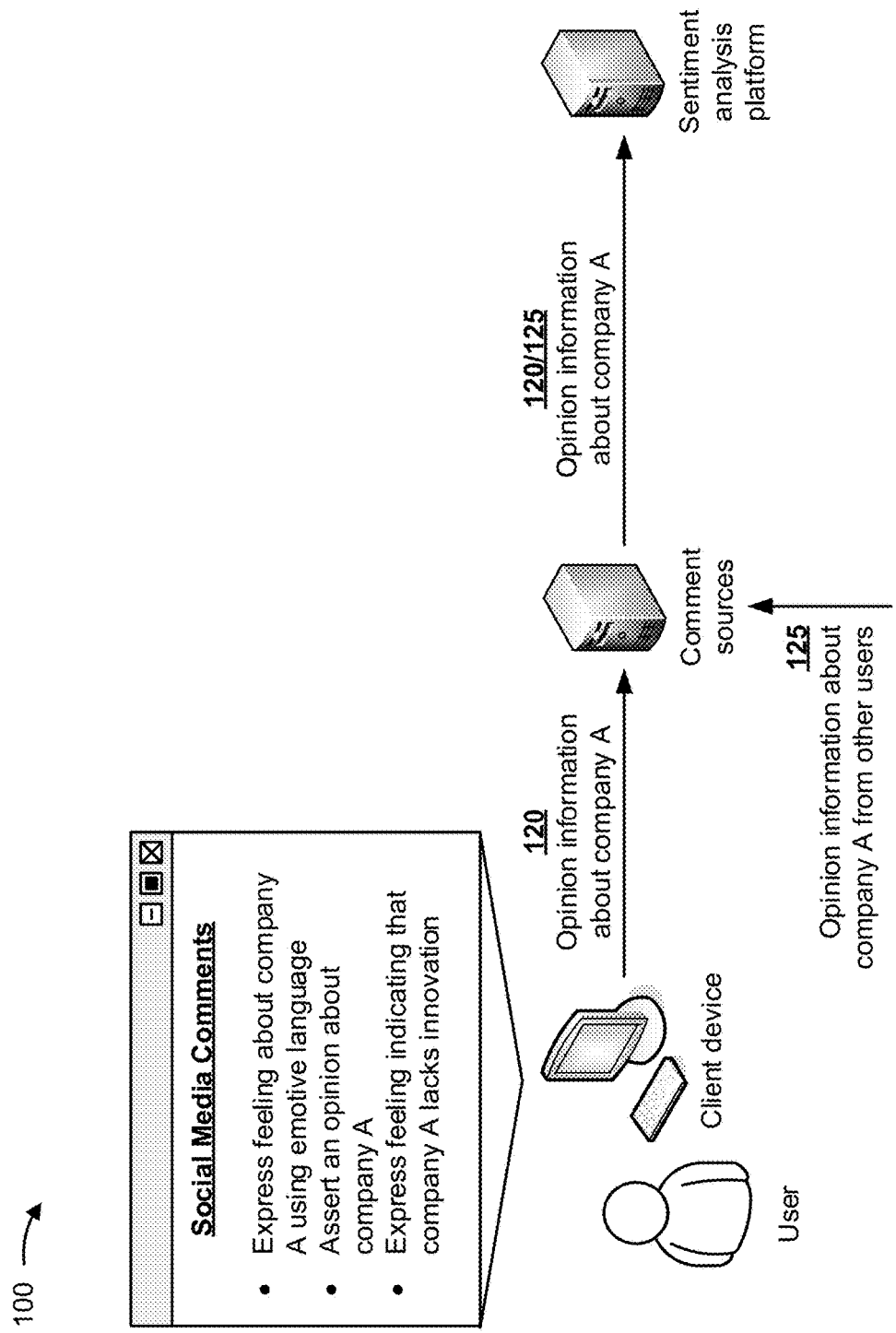

As shown in FIG. 1B, the user may utilize the client device to provide opinion information, about the entity (e.g., company A), to the one or more applications provided by the comment sources. For example, the opinion information may include an opinion expressing a feeling about company A and that uses emotive language, an asserted opinion about company A, an opinion expressing a feeling indicating that company A lacks innovation, and/or the like.

In some implementations, the opinion information may include an opinion expressing a feeling about a product of the company, a service of the company, the company, and/or the like, and that uses emotive language; an opinion that is asserted as a fact in a declarative statement; an opinion expressing a feeling that company lacks innovation and which implies that products and/or services of the company may be subject to automation; an opinion provided in a rating system associated with the company (e.g., ratings for the company may vary based on whether the ratings are expressed in an advertisement, a forum comment, an article, a credible source, and/or the like); and/or the like.

As further shown in FIG. 1B, and by reference number 120, when the user provides the opinion information about company A, the client device may provide the opinion information about company A to the comment sources, and the comment sources may receive the opinion information about company A. As further shown in FIG. 1B, and by reference number 125, the comment sources may receive opinion information about company A from the other users. For example, the other users may utilize the one or more applications provided by the comment sources to provide the opinion information about company A to the comment sources. In some implementations, the opinion information about company A, provided by the other users, may be similar to the opinion information, described above and provided by the user to the comment sources.

As further shown in FIG. 1B, and by reference numbers 120 and 125, the comment sources may provide the opinion information about company A (e.g., received from the user and the other users) to the sentiment analysis platform. In some implementations, the sentiment analysis platform may receive the opinion information about company A, and may store the opinion information about company A.

Figure 1C:
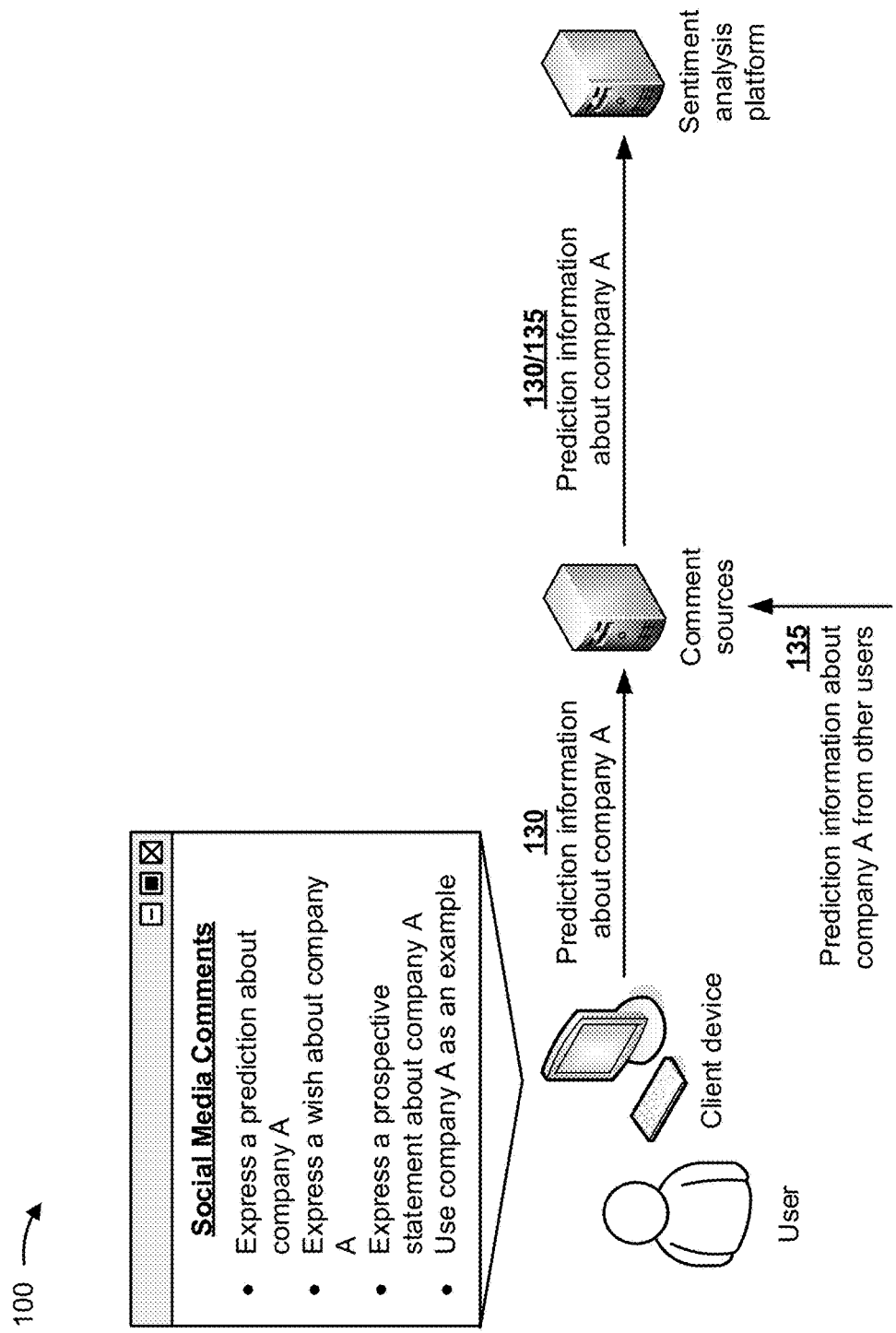

As shown in FIG. 1C, the user may utilize the client device to provide prediction information, about the entity (e.g., company A), to the one or more applications provided by the comment sources. For example, the prediction information may include a prediction about company A, a prediction expressing a wish about company A, a prediction expressing a prospective statement about company A lacks innovation, a prediction that uses company A as an example, and/or the like.

In some implementations, the prediction information may include a prediction about a company (e.g., "I think that product X of company A will be important if they add feature Y"); a prediction expressing a wish about the company (e.g., "I wish that product X of company A cost less"); a prediction expressing a proscriptive statement (e.g., "product X of company A should be similar to product Y of company B"); a prediction that uses the company as an example when stating a theory or identifying a trend (e.g., "Successful small companies, like company A, tend to be acquired by other companies"); and/or the like.

As further shown in FIG. 1C, and by reference number 130, when the user provides the prediction information about company A, the client device may provide the prediction information about company A to the comment sources, and the comment sources may receive the prediction information about company A. As further shown in FIG. 1C, and by reference number 135, the comment sources may receive prediction information about company A from the other users. For example, the other users may utilize the one or more applications provided by the comment sources to provide the prediction information about company A to the comment sources. In some implementations, the prediction information about company A, provided by the other users, may be similar to the prediction information, described above and provided by the user to the comment sources.

As further shown in FIG. 1C, and by reference numbers 130 and 135, the comment sources may provide the prediction information about company A (e.g., received from the user and the other users) to the sentiment analysis platform. In some implementations, the sentiment analysis platform may receive the prediction information about company A, and may store the prediction information about company A.

Figure 1D:
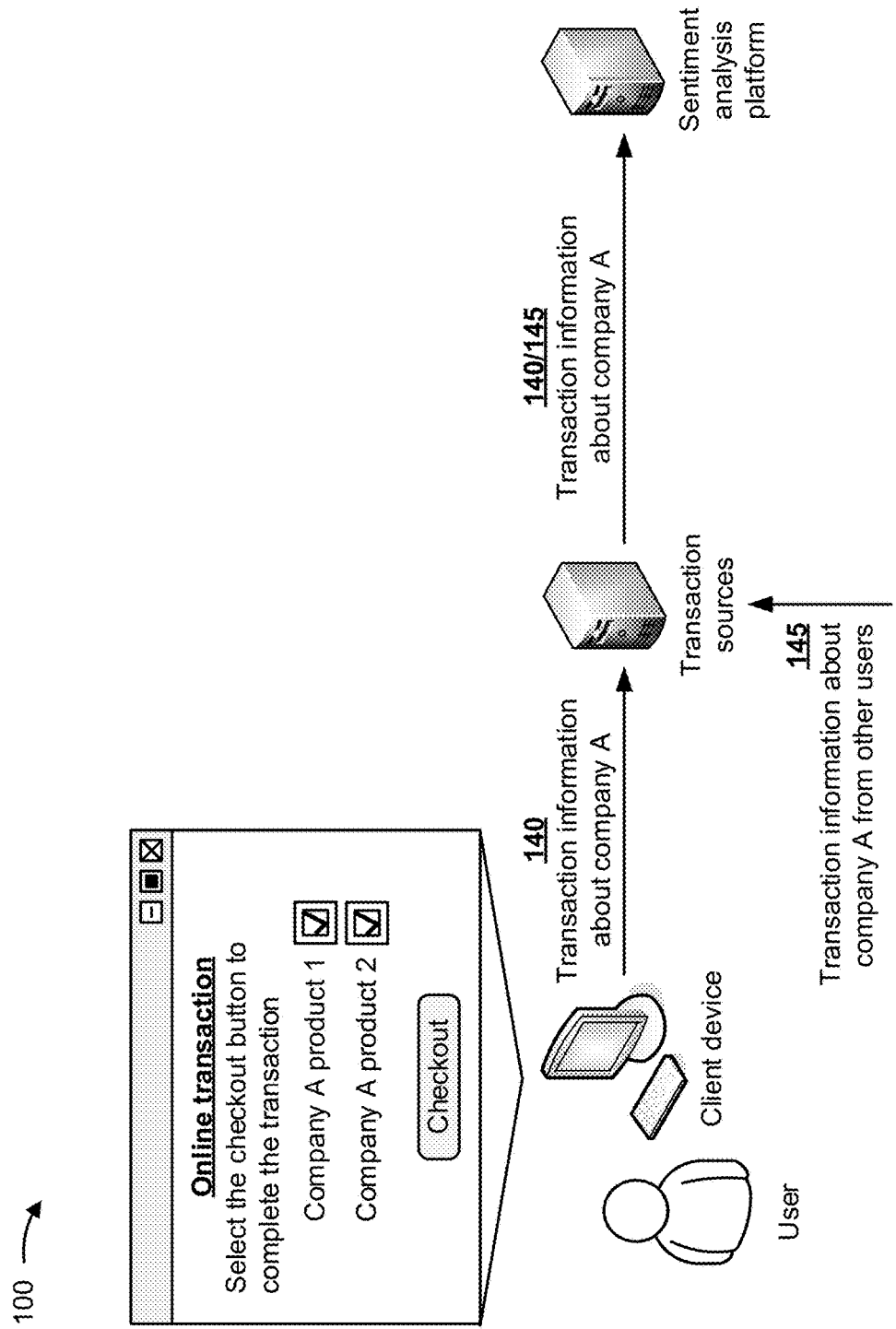

As shown in FIG. 1D, the user and the client device may also be associated with transaction sources associated with the entity (e.g., company A) and/or other entities (e.g., competitors of company A). Assume that the user utilizes the client device to access one or more applications provided by the transaction sources. In some implementations, the transaction sources may include sources that provide online transaction services, such as online retail applications, online product purchasing applications, online service purchasing applications, third party online transaction applications, and/or the like. As further shown in FIG. 1D, the user may utilize the client device to provide transaction information, about the entity (e.g., company A), to the one or more applications provided by the transaction sources. For example, the transaction information may include information indicating that the user is purchasing product 1 of company A, that the user is purchasing product 2 of company A, and/or the like.

In some implementations, the transaction information may include information indicating transactions between the user and company A, products and/or services in the transactions, prices paid by the user for the products and/or the services in the transactions, quantities of the products and/or the services purchased in each of the transactions, feedback by the user about the transactions after purchasing the products and/or the services, how often the user conducts transactions with company A, a quantity of transactions between the user and company A, and/or the like.

As further shown in FIG. 1D, and by reference number 140, when the user provides the transaction information about company A, the client device may provide the transaction information about company A to the transaction sources, and the transaction sources may receive the transaction information about company A. As further shown in FIG. 1D, and by reference number 145, the transaction sources may receive transaction information about company A from other users. For example, the other users may utilize the one or more applications provided by the transaction sources to provide the transaction information about company A to the transaction sources. In some implementations, the transaction information about company A, provided by the other users, may be similar to the transaction information, described above and provided by the user to the transaction sources.

As further shown in FIG. 1D, and by reference numbers 140 and 145, the transaction sources may provide the transaction information about company A (e.g., received from the user and the other users) to the sentiment analysis platform. In some implementations, the sentiment analysis platform may receive the transaction information about company A, and may store the transaction information about company A. In some implementations, the sentiment analysis platform may be a transaction source, and may receive the transaction information about company A directly from the client device when the user utilizes the client device to conduct transactions associated with company A.

Figure 1E:
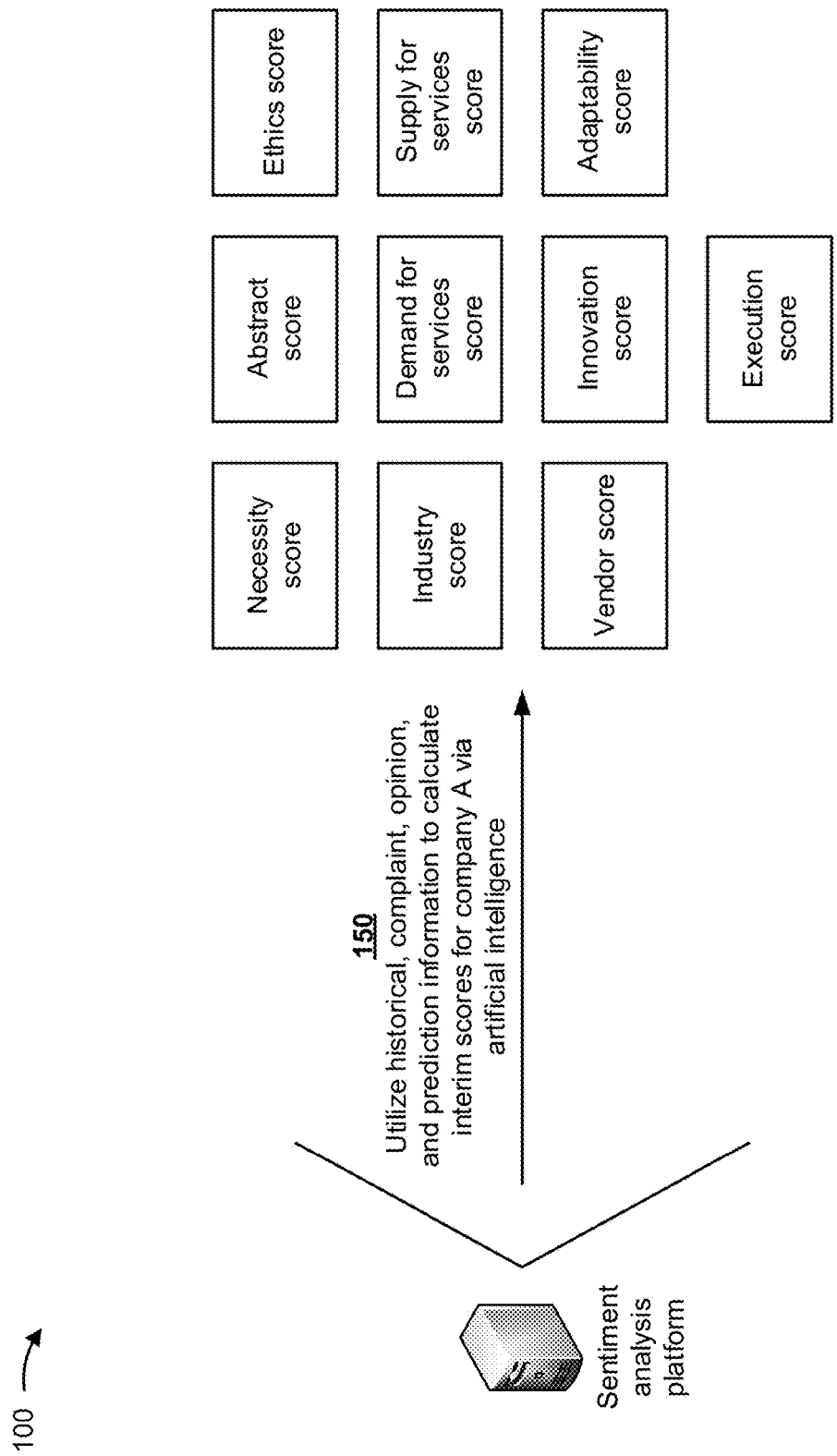

As shown in FIG. 1E, and by reference number 150, the sentiment analysis platform may utilize the historical information, the complaint information, the opinion information, and the prediction information to calculate interim scores (e.g., a necessity score, an abstract score, an ethics score, an industry score, a demands for service score, a supply for service score, a vendor score, an innovation score, an adaptability score, an execution score, and/or the like) for company A via artificial intelligence techniques. In some implementations, the sentiment analysis platform may utilize a variety of techniques to pre-process the historical information, the complaint information, the opinion information, and the prediction information. For example, in some implementations, the sentiment analysis platform may utilize optical character recognition (OCR) with the historical information, the complaint information, the opinion information, and the prediction information in order to convert image data into electronic data.

In some implementations, the semantic analysis platform, when utilizing OCR, may scan images of typed, handwritten, or printed text, and may mechanically or electronically convert images of typed, handwritten, or printed text into machine-encoded text (e.g., a digitized text). The machine-encoded text may then be electronically edited, searched, stored more compactly, displayed on-line, and/or used in machine processes. In some implementations, the machine-coded text may be utilized for cognitive computing, machine translation, text-to-speech, key data, text mining, and/or the like.

In some implementations, the sentiment analysis platform may utilize speech recognition with the historical information, the complaint information, the opinion information, and the prediction information in order to convert audio-based data into text-based data. For example, the sentiment analysis platform, when utilizing speech recognition, may identify audio-based words and/or phrases, emotions detected in the words and/or phrases, and/or the like in the historical information, the complaint information, the opinion information, and the prediction information, and may convert the audio-based words and/or phrases, the emotions, and/or the like into a machine-readable format (e.g., a digitized format). The digitized historical information, the complaint information, the opinion information, and the prediction information sentiment analysis platform may then be able to be electronically searched, edited, and/or the like, by the sentiment analysis platform.

In some implementations, the sentiment analysis platform may utilize machine learning models and language processing techniques to distinguish between a complaint, a prediction, and an opinion.

In some implementations, the sentiment analysis platform may utilize a data normalization method to process the historical information, the complaint information, the opinion information, and the prediction information and to eliminate and/or reduce redundant data, irrelevant data (e.g., advertisements), and/or the like. The data normalization method may include feature scaling. For example, if the range of values of raw data (e.g., raw historical information, raw complaint information, raw opinion information, and raw prediction information) varies widely, feature scaling may be used to normalize the raw data. In cases in which one of the features extracted from the raw data has a broad range of values, scaling may reduce the range of the features to a common scale so that each feature contributes proportionately. In some implementations, in addition to applying feature scaling (or rescaling) method, the sentiment analysis platform may apply a mean normalization technique, a feature standardization method, and/or the like to normalize data.

In some implementations, the historical information, the complaint information, the opinion information, and the prediction information be stored in a relational database. In such implementations, the historical information, the complaint information, the opinion information, and the prediction information may include unwanted redundancy and dependency. In some implementations, the sentiment analysis platform may utilize a data normalization method to organize columns (e.g., attributes) and tables (e.g., relations) of the relational database to minimize redundancy and dependency, and improve data integrity of the historical information, the complaint information, the opinion information, and the prediction information.

In some implementations, the sentiment analysis platform may utilize a data cleansing method to process the historical information, the complaint information, the opinion information, and the prediction information to detect and/or correct corrupt or inaccurate data from the historical information, the complaint information, the opinion information, and the prediction information. The data cleansing method may include detecting and correcting (e.g., removing) corrupt or inaccurate data from the historical information, the complaint information, the opinion information, and the prediction information. The data cleansing method also may include identifying incomplete, incorrect, inaccurate or irrelevant data in the historical information, the complaint information, the opinion information, and the prediction information, and may replace, modify, or delete the incomplete, incorrect, inaccurate or irrelevant data. In some implementations, the data cleansing method may be performed interactively with data wrangling tools, or as batch processing through scripting.

In some implementations, the artificial intelligence techniques may include a sentiment analysis model that utilizes multiple artificial analysis techniques. In some implementations, the sentiment analysis model may include a model that uses natural language processing, text analysis, and machine learning to systematically identify, extract, quantify, and study affective states and subjective information.

In some implementations, the sentiment analysis model may utilize natural language processing methods with the historical information, the complaint information, the opinion information, and the prediction information in order to make the historical information, the complaint information, the opinion information, and the prediction information analyzable. For example, the sentiment analysis model may use natural language processing to derive meaning from natural language input stemming from the historical information, the complaint information, the opinion information, and the prediction information. For example, the sentiment analysis model may utilize deep parsing to break sentences down into noun phrases and verb phrases and then determine associated prepositional phrases. In this way, the sentiment analysis model may determine how entities relate to each other and navigate through unstructured text.

In some implementations, the sentiment analysis model may utilize text analysis methods with the historical information, the complaint information, the opinion information, and the prediction information, such as a named entity recognition method, a classification method, a subjective classification method, a feature selection method, and/or the like.

In some implementations, the named entity recognition (NER) method (e.g., also called an entity identification method, an entity chunking method, or an entity extraction method) may identify and classify named entities in the historical information, the complaint information, the opinion information, and the prediction information, such as names of persons, organizations, locations, expressions of time, quantities, monetary values, percentages, and/or the like. For example, the NER method may extract names of the entity (e.g., company A), names of competitors of the entity, monetary values associated with transactions with the entity, and/or the like.

In some implementations, the classification method may categorize the historical information, the complaint information, the opinion information, and the prediction information into different domains (e.g., markets, economy, industry, technology, and/or the like). The classification method may be used since there may be a different set of features for different domains and thus, each domain may have a different classifier. For example, a news article in the technology domain may be positive news for company A but may be negative news for company B, great news about company A may be slightly bad news for company B, who is a competitor (e.g., an vice versa), and/or the like. Thus, if the sentiment analysis model knows competitor information associated with competitors for each entity, then when the sentiment analysis model identifies information that is good (or bad) for an entity, the sentiment analysis model may determine that the information is bad (or good) for the competitors of the entity.

In some implementations, the subjectivity classification method may classify sentences, in the historical information, the complaint information, the opinion information, and the prediction information, as subjective or objective since subjective sentences may include sentiments while objective sentences (e.g., with facts and figures) may not include sentiments. In some implementations, the subjectivity classification method may utilize machine learning methods, such as a support vector machine (SVM), a maximum entropy method, a naive Bayes classifier method, and/or the like.

In some implementations, the feature selection method may select subsets of relevant features (e.g., variables or predictors), from the historical information, the complaint information, the opinion information, and the prediction information, for use in the sentiment analysis model. In some implementations, the feature selection method may include a wrapper method (e.g., that uses a predictive model to score feature subsets), a filter method (e.g., that uses a proxy measure instead of an error rate to score a feature subset), an embedded method (e.g., that performs feature selection as part of construction of the sentiment analysis mode), and/or the like.

In some implementations, the sentiment analysis model may utilize machine learning methods with the historical information, the complaint information, the opinion information, and the prediction information, such as a decision classifier model, a linear classifier model (e.g., a SVM model or a neural network model), a rule-based classifier model, a probabilistic classifier model (e.g., a naïve Bayes classifier model, a Bayesian network classifier model, or a maximum entropy classifier model), and/or the like. For example, the sentiment analysis model may utilize a SVM model to determine linear separators in a search space (e.g., of data) that can best separate different classes. In some implementations, the sentiment analysis model may utilize a neural network model to learn (e.g., progressively improve performance of) tasks by considering examples, without task-specific programming.

In some implementations, the sentiment analysis model may utilize a naïve Bayes classifier model to compute a posterior probability of a class based on a distribution of words in the historical information, the complaint information, the opinion information, and the prediction information. The naïve Bayes classifier model may predict a probability that a given feature set belongs to a particular label associated with the historical information, the complaint information, the opinion information, and the prediction information.

In some implementations, the Bayesian network classifier model may represent probabilistic relationships between words in the historical information, the complaint information, the opinion information, and the prediction information. For example, the Bayesian network classifier model may be a directed acyclic graph whose nodes represent random variables, and whose edges represent conditional dependencies. In some implementation, the sentiment analysis platform may specify a complete joint probability distribution over the variables.

In some implementations, the sentiment analysis platform may utilize a maximum entropy classifier model. A maximum entropy classifier model may convert labeled feature sets to vectors using encoding. The encoded vector may then be used to calculate weights for each feature, which may then be combined to determine a most likely label for a feature set.

In some implementations, instead of utilizing machine learning methods, the sentiment analysis model may utilize a knowledge-based (or lexicon-based) methods and/or hybrid methods. The knowledge-based methods may classify information by affect categories based on a presence of unambiguous affect words, such as happy, sad, afraid, bored, and/or the like. The hybrid methods may include elements of the machine learning methods and elements from the knowledge-based methods (e.g., ontologies and semantic networks).

In some implementations, the sentiment analysis platform may train the sentiment analysis model prior to utilizing the sentiment analysis model with the historical information, the complaint information, the opinion information, and the prediction information to calculate the interim scores. In such implementations, the sentiment analysis platform may utilize training data to train one or more portions of the sentiment analysis model. The training data may include complaint information, opinion information, and/or prediction information previously received by the sentiment analysis platform, previous information received by the sentiment analysis platform that enabled the sentiment analysis platform to calculate necessity scores, abstract scores, ethics scores, industry scores, demands for service scores, supply for service scores, vendor scores, innovation scores, adaptability scores, execution scores, and/or the like for entities, and/or the like.

In some implementations, the necessity score calculated by the sentiment analysis platform may provide an indication of whether the products and/or the services of company A are necessities or luxury items, and/or the like.

In some implementations, the abstract score calculated by the sentiment analysis platform may provide an indication of whether the products and/or services of company A have the potential to be offered via a platform (e.g., a web site, a brick and mortar store, and/or the like), an indication of whether company A has the ability to build the platform and tools available to build the platform, if the company already offers the platform, an indication of whether the products and/or the services of company A provide frameworks to build up the products and/or the services on the platform, an indication of whether company A has potential partners to fill in missing products and/or services to achieve a platform, and/or the like.

In some implementations, the ethics score calculated by the sentiment analysis platform may provide an indication of whether priorities of company A are reflected by complaints, opinions, predictions, and/or the like about company A, and/or the like.

In some implementations, the industry score calculated by the sentiment analysis platform may provide an indication of aggregate opinion information about an industry in which company A operates, an indication of whether the industry is dying (e.g., based on previously-identified industries that were subject to automation), and/or the like.

In some implementations, the demand for services score calculated by the sentiment analysis platform may provide an indication of aggregate wish list data about the products and/or the services of company A, and/or the like. In some implementations, the sentiment analysis platform may calculate scores, for competitors of an entity, that indicate how the entity is affected based on events associated with each of the competitors. For example, a social media entity may not influence an Internet-related services entity as much as other Internet-related services entities do. In some implementations, the sentiment analysis platform may automatically calculate the competitor scores based on how often an entity and the entity's competitor are mentioned in the news together, how often the products and/or services of the entity and the competitor are mentioned in the news together, and/or the like. When the entity and the competitor (or their products and/or services) are mentioned in the news together more often, a higher score may be allotted to the competitor. When the entity and the competitor (or their products and/or services) are mentioned in the news together less often, a lower score may be allotted to the competitor.

In some implementations, the supply for services score calculated by the sentiment analysis platform may provide an indication of aggregate complaint information associated with product stocking by company A, product delivery time by company A, product quality issues of company A, and/or the like, which may indicate supply problems for company A, and/or the like.

In some implementations, the vendor score calculated by the sentiment analysis platform may provide an indication of qualities associated with third party vendors, partners, contractors, and/or the like used by company A, and/or the like.

In some implementations, the innovation score calculated by the sentiment analysis platform may provide an indication of impending innovations of company A as indicated by trends in the complaint information, the opinion information, and the prediction information, an indication of an ability of company A to deliver innovations using existing tools (e.g., existing research and development investment, history of innovation, and/or the like), an indication of an ability of company A to identify a need for new tools for innovation, and indication of an ability of company A to implement the new tools for innovation, patents and/or patent publications associated with company A, and/or the like.

In some implementations, the adaptability score calculated by the sentiment analysis platform may provide an indication of aggregate opinion information for remediation indicators associated with company A (e.g., company A fixed a delivery issue in less than a week, company A quickly pivoted to new direction, and/or the like), and/or the like.

In some implementations, the execution score calculated by the sentiment analysis platform may provide an indication of whether company A is likely to be acquired due to company A producing crucial products and/or services more efficiently than larger companies that do not provide the products and/or the services but have a budget to acquire company A, and/or the like.

Figure 1F:
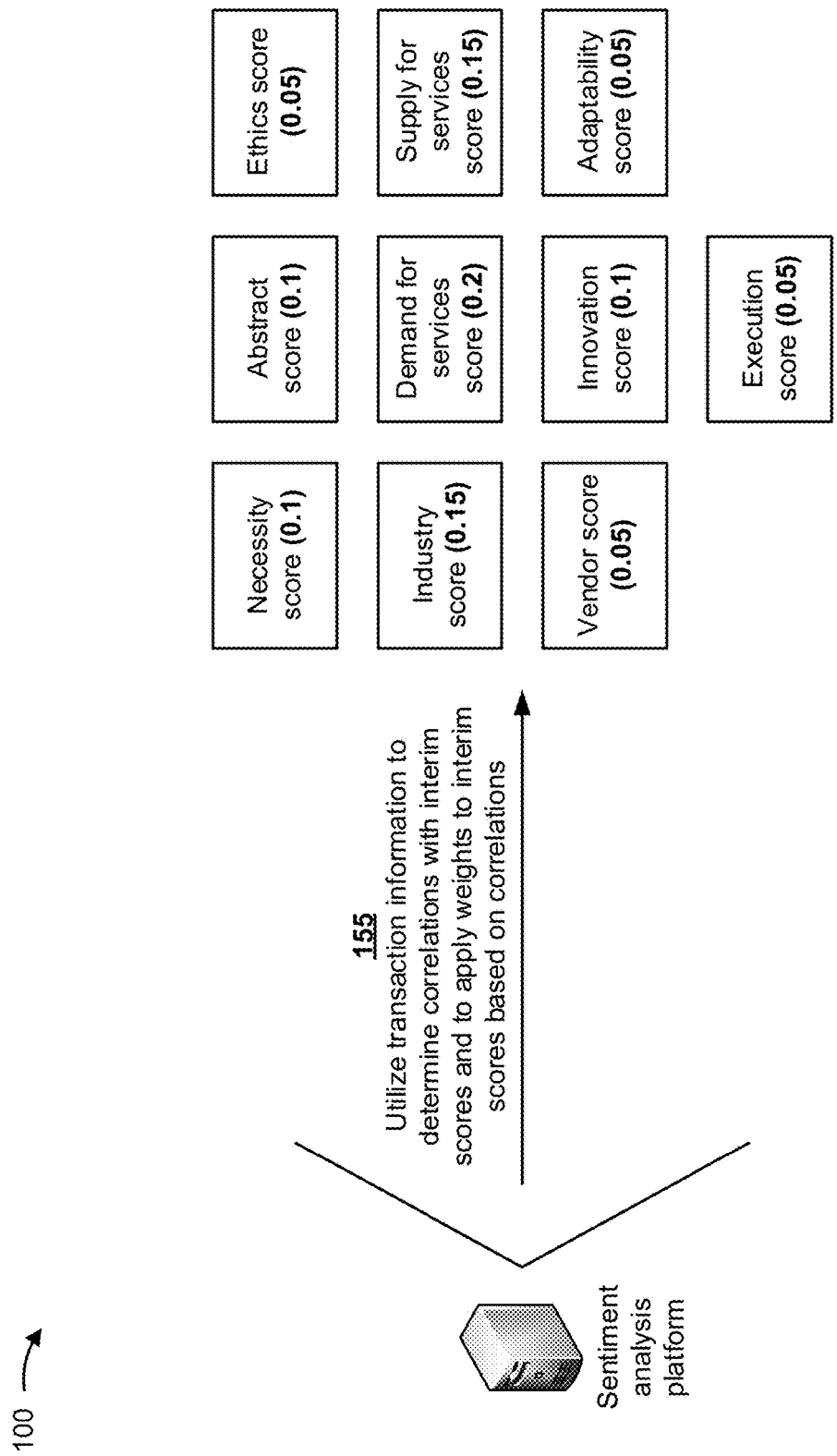

As shown in FIG. 1F, and by reference number 155, the sentiment analysis platform may utilize the transaction information to determine correlations with the interim scores (e.g., the necessity score, the abstract score, the ethics score, the industry score, the demands for service score, the supply for service score, the vendor score, the innovation score, the adaptability score, the execution score, and/or the like). In some implementations, the sentiment analysis platform may utilize a correlation clustering method, a Pearson's product-moment coefficient method, an Anscombe's quartet method, a Spearman's rank-correlation coefficient method, and/or the like in order to determine the correlations between the transaction information and the interim scores.

A clustering method may include partitioning data points into groups based on their similarity, and the correlation clustering method may include clustering a set of objects into an optimum number of clusters without specifying that number in advance. Given a collection of paired (x, y) variables, the Pearson's product-moment coefficient method produces a value, between −1 and +1, that quantifies a strength of dependence between the variables x and y. A value of +1 means that all of the (x, y) points lie exactly on a line with positive slope, a value of −1 means that all of the points lie exactly on a line with negative slope, and a value of 0 means that there is no relationship between the two variables. The Anscombe's quartet method utilizes four datasets that have nearly identical simple descriptive statistics, yet appear very different when graphed. The Spearman's rank-correlation coefficient method provides a non-parametric measure of rank correlation (e.g., a statistical dependence between a ranking of two variables), and assesses how well a relationship between two variables can be described using a monotonic function.

As further shown in FIG. 1F, and by reference number 155, the sentiment analysis platform may apply weights to the interim scores based on the correlations between the transaction information and the interim scores. For example, as shown, for company A, the sentiment analysis platform may apply a weight of 0.1 to the necessity score, a weight of 0.1 to the abstract score, a weight of 0.05 to the ethics score, a weight of 0.15 to the industry score, a weight of 0.2 to the demands for service score, a weight of 0.15 to the supply for service score, a weight of 0.05 to the vendor score, a weight of 0.1 to the innovation score, a weight of 0.05 to the adaptability score, and a weight of 0.05 to the execution score. Although not shown in FIG. 1F, the sentiment analysis platform may generate weighted competitor scores for each of the competitors of company A.

As shown in FIG. 1G, and by reference number 160, the sentiment analysis platform may generate a prediction about company A based on the weighted interim scores. In some implementations, the prediction about company A may include a prediction about a present or a future stock price of company A, a present or a future value of company A, a present or a future price to book ratio of company A, a present or a future price to earnings ratio of company A, a present or a future price to earnings growth ratio of company A, a present or a future dividend yield of company A, a present or a future earnings per share ratio of company A, a present or a future growth rate of company A, a present or a future return on invested capital of company A, a present or a future return on assets of company A, a present or a future price to sales ratio of company A, and/or the like.

In some implementations, the sentiment analysis platform may calculate a combined score for company A based on the weighted interim scores, and generate the prediction about company A based on the combined score for company A. In some implementations, the sentiment analysis platform may calculate the combined score for company A by adding the weighted interim scores together, by adding the weighted interim scores together to generate a sum and dividing the sum by the number of weighted interim scores (e.g., ten), and/or the like.

Figure 1H:
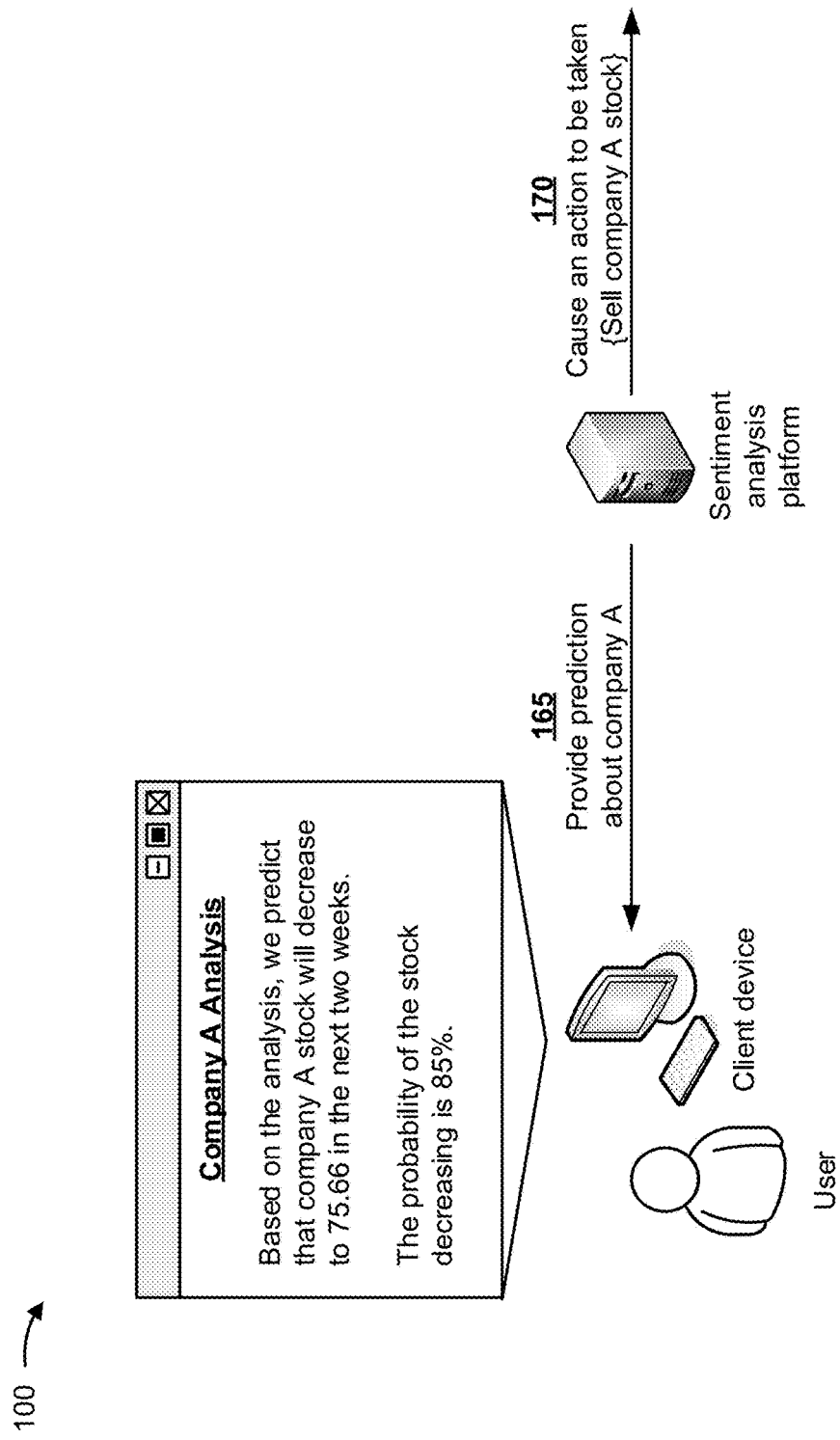

As shown in FIG. 1H, and by reference number 165, the sentiment analysis platform may provide the prediction about company A to the client device, and the client device may display the prediction about company A to the user. For example, as shown, the client device may provide a user interface indicating that based on the analysis of company A, it is predicted that the stock price of company A will decrease to $75.66 per share in the next two weeks, and that a probability of the stock price of company A decreasing is about 85%. In some implementations, the sentiment analysis platform may provide the prediction about company A via a notification provided to client devices associated with the sentiment analysis platform. In some implementations, the sentiment analysis platform may provide predictions about a variety of entities (e.g., via notifications) to the client devices associated with the sentiment analysis platform. In some implementations, the sentiment analysis platform may provide a recommendation to the user (e.g., via the client device) about company A, such as selling the stock of company A now, buying the stock of company A in two weeks, holding onto the stock of company A, and/or the like.

As further shown in FIG. 1H, and by reference number 170, the sentiment analysis platform may cause an action to be taken (e.g., automatically selling the stock of company A) on behalf of the user (e.g., with the user's permission). In some implementations, the action may include automatically providing, to the client device, a notification indicating the prediction about company A, automatically sending an instruction to a financial server to buy or sell the stock of company A, automatically causing a calculation of a future value of a financial portfolio (e.g., associated with the user and including the stock of company A) to be generated, automatically sending an instruction to the financial server to buy or sell the stock of company A for the financial portfolio, automatically requesting permission from the user to buy or sell the stock of company A, and/or the like.

In this way, the sentiment analysis platform may utilize artificial intelligence to make a prediction about an entity based on user sentiment and transaction history, which may remove human subjectivity and waste from an entity analysis process, and which may improve speed and efficiency of the entity analysis process and conserve computing resources (e.g., processors, memory, and/or the like). Furthermore, implementations described herein use a computerized process to perform tasks or roles that were not previously performed or were previously performed using subjective human intuition or input. For example, existing stock trading software fails to consider sentiments of people who have opinions about entities and transactions conducted by people with the entities. Finally, utilize artificial intelligence to make a prediction about an entity based on user sentiment and transaction history conserves computing resources (e.g., processors, memory, and/or the like) that would otherwise be wasted in unsuccessfully attempting to make an accurate prediction about the entity.

As indicated above, FIGS. 1A-1H are provided merely as examples. Other examples are possible and may differ from what was described with regard to FIGS. 1A-1H.

Figure 2:
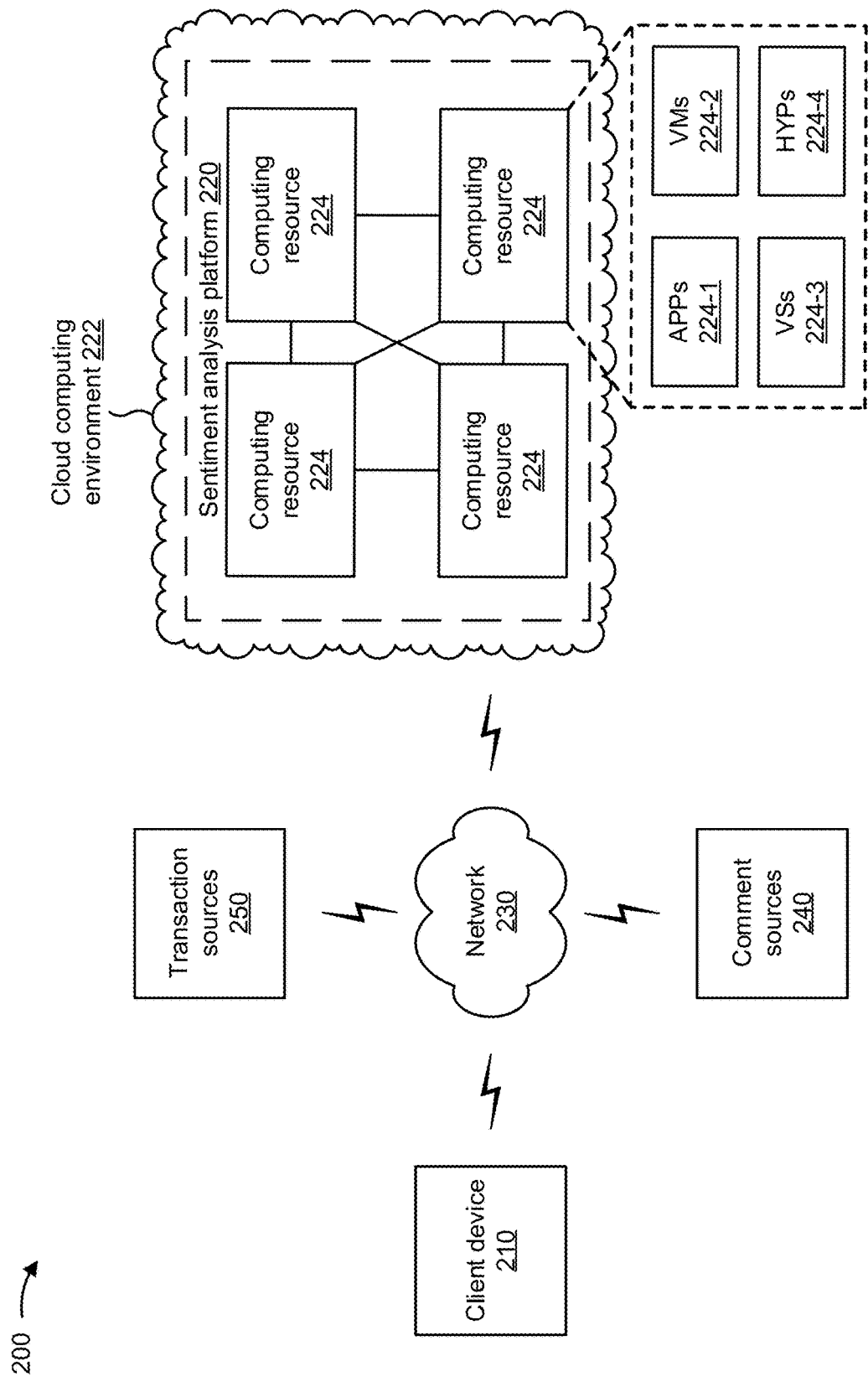
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a sentiment analysis platform 220, a network 230, comment sources 240, and transaction sources 250. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to sentiment analysis platform 220, comment sources 240, and/or transaction sources 250.

Sentiment analysis platform 220 includes one or more devices that utilize artificial intelligence to make a prediction about an entity based on user sentiment and transaction history. In some implementations, sentiment analysis platform 220 may be designed to be modular such that certain software components may be swapped in or out depending on a particular need. As such, sentiment analysis platform 220 may be easily and/or quickly reconfigured for different uses. In some implementations, sentiment analysis platform 220 may receive information from and/or transmit information to one or more client devices 210, comment sources 240, and/or transaction sources 250.

In some implementations, as shown, sentiment analysis platform 220 may be hosted in a cloud computing environment 222. Notably, while implementations described herein describe sentiment analysis platform 220 as being hosted in cloud computing environment 222, in some implementations, sentiment analysis platform 220 may not be cloud-based (i.e., may be implemented outside of a cloud computing environment) or may be partially cloud-based.

Cloud computing environment 222 includes an environment that hosts sentiment analysis platform 220. Cloud computing environment 222 may provide computation, software, data access, storage, etc. services that do not require end-user knowledge of a physical location and configuration of system(s) and/or device(s) that hosts sentiment analysis platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host sentiment analysis platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210, comment sources 240, and/or transaction sources 250. Application 224-1 may eliminate a need to install and execute the software applications on client device 210, comment sources 240, and/or transaction sources 250. For example, application 224-1 may include software associated with sentiment analysis platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210, or an operator of sentiment analysis platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Comment source 240 includes one or more devices capable of receiving, generating, storing, processing, and/or providing information, such as information described herein. For example, comment source 240 may include a laptop computer, a tablet computer, a desktop computer, a server device, a group of server devices, or a similar type of device, which provides a social media application, a blog, a message board, and/or the like for access by client device 210. In some implementations, comment source 240 may receive information from and/or transmit information to client device 210 and/or sentiment analysis platform 220.

Transaction source 250 includes one or more devices capable of receiving, generating, storing, processing, and/or providing information, such as information described herein. For example, transaction source 250 may include a laptop computer, a tablet computer, a desktop computer, a server device, a group of server devices, or a similar type of device, which provides for online transactions between client device 210 and an entity. In some implementations, transaction source 250 may receive information from and/or transmit information to client device 210 and/or sentiment analysis platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
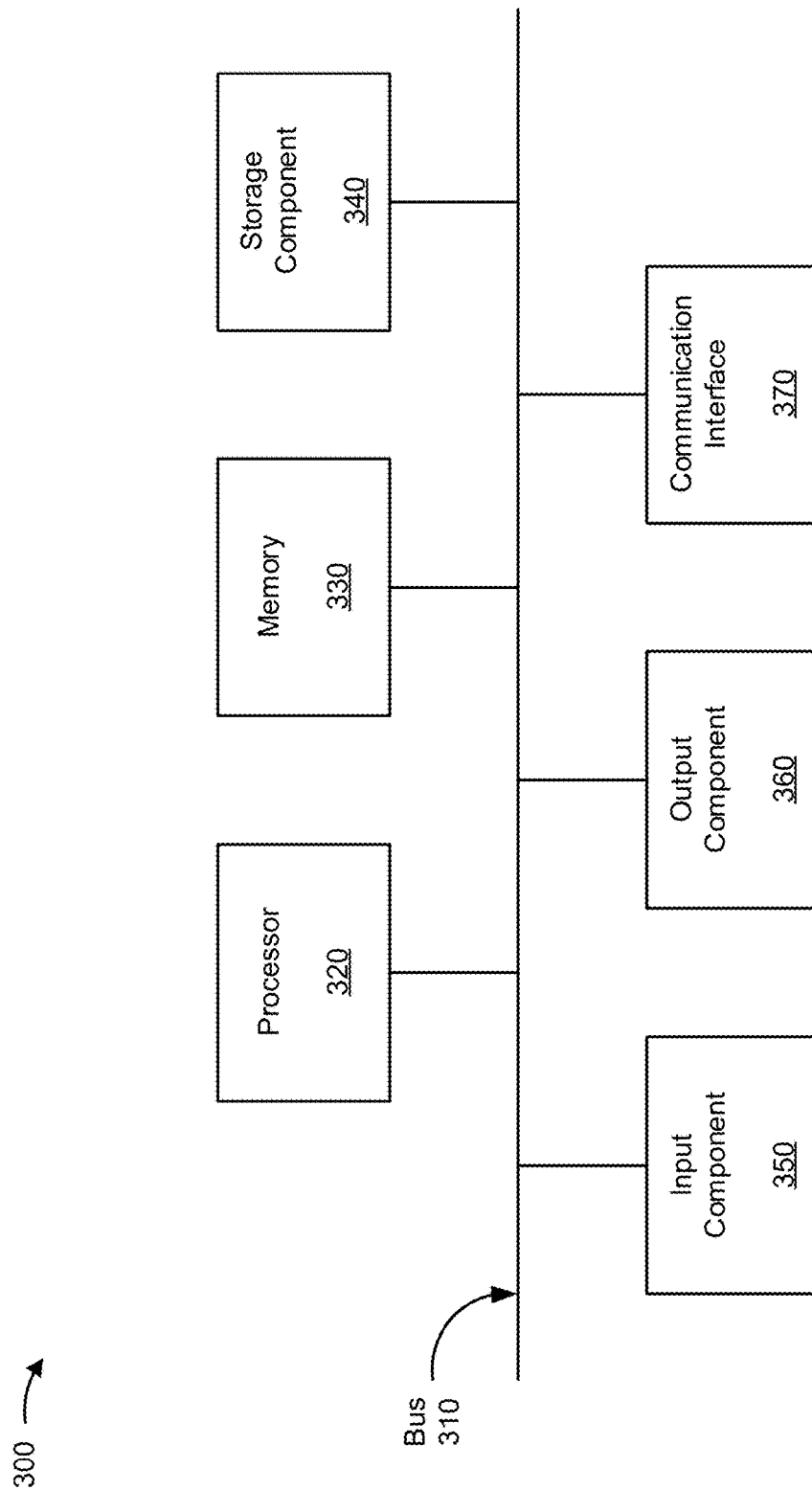
FIG. 3 is a diagram of example components of one or more devices of FIG. 2.

FIG. 3 is a diagram of example components of a device 300. Device 300 may correspond to client device 210, sentiment analysis platform 220, computing resource 224, comment source 240, and/or transaction source 250. In some implementations, client device 210, sentiment analysis platform 220, computing resource 224, comment source 240, and/or transaction source 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing artificial intelligence to make a prediction about an entity based on user sentiment and transaction history. In some implementations, one or more process blocks of FIG. 4 may be performed by sentiment analysis platform 220. In some implementations, one or more process blocks of FIG. 4 may be performed by another device or a group of devices separate from or including sentiment analysis platform 220, such as client device 210, comment source 240, and/or transaction source 250.

As shown in FIG. 4, process 400 may include receiving comment information associated with users and regarding an entity (block 410). For example, sentiment analysis platform 220 may receive comment information associated with users and regarding an entity. In some implementations, a user may utilize client device 210 to provide positive information (e.g., an endorsement of the entity or a product and/or service of the entity) and/or complaint information, about an entity, to the one or more applications provided by comment sources 240. In some implementations, the complaint information may include a type of an opinion, such as switching from one company to another company that provides an equivalent product or service; a negative statement about a company, employees of the company, a brand of the company, or a product or a service offered by the company; a positive statement about competitors of the company, employees of the competitors, brands of the competitors, or products or services offered by the competitors; using a platform that automates or invalidates the products and/or services offered by the company (e.g., using a large online merchant to sell goods instead of creating a website may invalidate a website-creation company); and/or the like.

In some implementations, comment sources 240 may receive complaint information about the entity from other users. Comment sources 240 may provide the complaint information about the entity (e.g., received from the user and the other users) to sentiment analysis platform 220. In some implementations, sentiment analysis platform 220 may receive the complaint information about the entity, and may store the complaint information about the entity.

In some implementations, sentiment analysis platform 220 may receive historical information about the entity (e.g., from third party financial sources that provide historical information, such as historical financial information about companies). In some implementations, the historical information about the entity may include information indicating a financial health of the entity, products offered by the entity, services offered by the entity, brands associated with the entity, competitors of the entity, financial health of the competitors, products offered by the competitors, services offered by the competitors, brands associated with the competitors, correlations between user opinions and historical stock prices (or other valuations) of the entity, sentiment correlations with the historical stock prices of the entity, and/or the like.

In some implementations, the user may utilize client device 210 to provide opinion information, about the entity, to the one or more applications provided by comment sources 240. In some implementations, the opinion information may include an opinion expressing a feeling about a product of the entity, a service of the entity, the entity, and/or the like, and that uses emotive language; an opinion that is asserted as a fact in a declarative statement; an opinion expressing a feeling that the entity lacks innovation and which implies that products and/or services of the entity may be subject to automation; an opinion provided in a rating system associated with the entity; and/or the like.

In some implementations, comment sources 240 may receive opinion information about the entity from the other users. In some implementations, comment sources 240 may provide the opinion information about the entity (e.g., received from the user and the other users) to sentiment analysis platform 220. In some implementations, sentiment analysis platform 220 may receive the opinion information about the entity, and may store the opinion information about the entity.

In some implementations, the user may utilize client device 210 to provide prediction information, about the entity, to the one or more applications provided by comment sources 240. In some implementations, the prediction information may include a prediction about the entity (e.g., "I think that product X of company A will be important if they add feature Y"); a prediction expressing a wish about the entity (e.g., "I wish that product X of company A cost less"); a prediction expressing a proscriptive statement (e.g., "product X of company A should be similar to product Y of company B"); a prediction that uses the entity as an example when stating a theory or identifying a trend (e.g., "Successful small companies, like company A, tend to be acquired by other companies"); and/or the like.

In some implementations, comment sources 240 may receive prediction information about the entity from the other users. In some implementations, comment sources 240 may provide the prediction information about the entity (e.g., received from the user and the other users) to sentiment analysis platform 220. In some implementations, sentiment analysis platform 220 may receive the prediction information about the entity, and may store the prediction information about the entity.

In some implementations, sentiment analysis platform 220 and comment sources 240 may search for and scrape the comment information about the entity (e.g., the complaint information, the historical information, the opinion information, the prediction information, and/or the like) from public forums, such as websites associated with the entity, blogs about the entity, consumer websites, blogs about an industry associated with the entity, websites offering for sale products and/or services of the entity, and/or the like.

In some implementations, sentiment analysis platform 220 may receive the different types of the comment information (e.g., the complaint information, the historical information, the opinion information, the prediction information, and/or the like), and may utilize artificial intelligence techniques, described herein, to analyze the comment information and to distinguish between the different types of the comment information.

In this way, sentiment analysis platform 220 may receive the comment information associated with the users and regarding the entity.

As further shown in FIG. 4, process 400 may include receiving transaction information associated with the users and regarding the entity (block 420). For example, sentiment analysis platform 220 may receive transaction information associated with the users and regarding the entity. In some implementations, the user may utilize client device 210 to provide transaction information, about the entity, to the one or more applications provided by transaction sources 250. In some implementations, the transaction information may include information indicating transactions between the user and the entity, products and/or services in the transactions, prices paid by the user for the products and/or the services in the transactions, quantities of the products and/or the services purchased in each of the transactions, feedback by the user about the transactions after purchasing the products and/or the services, how often the user conducts transactions with the entity, a quantity of transactions between the user and the entity, and/or the like.

In some implementations, transaction sources 250 may receive transaction information about the entity from other users. In some implementations, transaction sources 250 may provide the transaction information about the entity (e.g., received from the user and the other users) to sentiment analysis platform 220. In some implementations, sentiment analysis platform 220 may receive the transaction information about the entity, and may store the transaction information about the entity.

In some implementations, sentiment analysis platform 220 may be a transaction source 250 and/or may receive the transaction information from other transaction sources 250. In some implementations, sentiment analysis platform 220 may access the transaction information from actual transaction histories of the user and the other users. In such implementations, sentiment analysis platform 220 may utilize actual transaction histories of the users to confirm that users made purchases that form bases of complaints, to identify instances where users may have switched service providers (e.g., a payment history confirming that a user switched from a first cable provider to a second cable provider), to identify a trend or changes in trends associated with spending at one merchant versus spending at a competitor of the merchant, and/or the like.

In this way, sentiment analysis platform 220 receive the transaction information associated with the users and regarding the entity.

As further shown in FIG. 4, process 400 may include determining correlations between the comment information and the transaction information (block 430). For example, sentiment analysis platform 220 may determine correlations between the comment information and the transaction information. In some implementations, sentiment analysis platform 220 may utilize the historical information, the complaint information, the opinion information, and the prediction information to calculate interim scores (e.g., a necessity score, an abstract score, an ethics score, an industry score, a demands for service score, a supply for service score, a vendor score, an innovation score, an adaptability score, an execution score, and/or the like) for the entity via artificial intelligence techniques. In some implementations, the artificial intelligence techniques may include a sentiment analysis model that utilizes multiple artificial analysis techniques. In some implementations, the sentiment analysis model may include a model that uses natural language processing, text analysis, and machine learning to systematically identify, extract, quantify, and study affective states and subjective information.

In some implementations, the sentiment analysis model may utilize machine learning methods with the historical information, the complaint information, the opinion information, and the prediction information, such as a decision classifier model, a linear classifier model (e.g., a SVM model or a neural network model), a rule-based classifier model, a probabilistic classifier model (e.g., a naïve Bayes classifier model, a Bayesian network classifier model, or a maximum entropy classifier model), and/or the like.

In some implementations, instead of utilizing machine learning methods, the sentiment analysis model may utilize a knowledge-based (or lexicon-based) methods and/or hybrid methods. The knowledge-based methods may classify information by affect categories based on a presence of unambiguous affect words, such as happy, sad, afraid, bored, and/or the like. The hybrid methods may include elements of the machine learning methods and elements from the knowledge-based methods (e.g., ontologies and semantic networks).

In some implementations, sentiment analysis platform 220 may utilize the transaction information to determine correlations with the interim scores (e.g., the necessity score, the abstract score, the ethics score, the industry score, the demands for service score, the supply for service score, the vendor score, the innovation score, the adaptability score, the execution score, and/or the like). In some implementations, sentiment analysis platform 220 may utilize a correlation clustering method, a Pearson's product-moment coefficient method, an Anscombe's quartet method, a Spearman's rank-correlation coefficient method, and/or the like in order to determine the correlations between the transaction information and the interim scores.

In this way, sentiment analysis platform 220 may determine the correlations between the comment information and the transaction information.

As further shown in FIG. 4, process 400 may include generating a prediction about the entity based on the comment information, the transaction information, and the correlations (block 440). For example, sentiment analysis platform 220 may generate a prediction about the entity based on the comment information, the transaction information, and the correlations. In some implementations, sentiment analysis platform 220 may apply weights to the interim scores based on the correlations between the transaction information and the interim scores. In some implementations, sentiment analysis platform 220 may utilize machine learning techniques, described herein, to identify correlations between the comment information, the transaction information, historical stock prices of the entity, and/or the like, and may utilize the identified correlations to determine the weights. In some implementations, sentiment analysis platform 220 may generate a prediction about the entity based on the weighted interim scores. In some implementations, the prediction about the entity may include a prediction about a present or a future stock price of the entity, a present or a future value of the entity, a present or a future price to book ratio of the entity, a present or a future price to earnings ratio of the entity, a present or a future price to earnings growth ratio of the entity, a present or a future dividend yield of the entity, a present or a future earnings per share ratio of the entity, a present or a future growth rate of the entity, a present or a future return on invested capital of the entity, a present or a future return on assets of the entity, a present or a future price to sales ratio of the entity, and/or the like.

In some implementations, sentiment analysis platform 220 may calculate a combined score for the entity based on the weighted interim scores, and generate the prediction about the entity based on the combined score for the entity. In some implementations, sentiment analysis platform 220 may calculate the combined score for the entity by adding the weighted interim scores together, by adding the weighted interim scores together to generate a sum and dividing the sum by the number of weighted interim scores, and/or the like.

In this way, sentiment analysis platform 220 may generate the prediction about the entity based on the comment information, the transaction information, and the correlations.

As further shown in FIG. 4, process 400 may include providing the prediction (block 450). For example, sentiment analysis platform 220 may provide the prediction. In some implementations, sentiment analysis platform 220 may provide the prediction about the entity to client device 210, and client device 210 may display the prediction about the entity to the user. In some implementations, sentiment analysis platform 220 may provide the prediction about the entity via a notification provided to client devices 210 associated with sentiment analysis platform 220. In some implementations, sentiment analysis platform 220 may provide predictions about a variety of entities (e.g., via notifications) to client devices 210 associated with sentiment analysis platform 220. In some implementations, sentiment analysis platform 220 may provide a recommendation to the user (e.g., via client device 210) about the entity, such as selling the stock of the entity now, buying the stock of the entity in two weeks, holding onto the stock of the entity, and/or the like.

In this way, sentiment analysis platform 220 may provide the prediction.

As further shown in FIG. 4, process 400 may include causing an action to be performed based on the prediction (block 460). For example, sentiment analysis platform 220 may cause an action to be performed based on the prediction. In some implementations, sentiment analysis platform 220 may cause an action to be taken (e.g., automatically selling the stock of the entity) on behalf of the user (e.g., with the user's permission). In some implementations, the action may include automatically providing, to client device 210, a notification indicating the prediction about the entity, automatically sending an instruction to a financial server to buy or sell the stock of the entity, automatically causing a calculation of a future value of a financial portfolio (e.g., associated with the user and including the stock of the entity) to be generated, automatically sending an instruction to the financial server to buy or sell the stock of the entity for the financial portfolio, automatically requesting permission from the user to buy or sell the stock of the entity, and/or the like.

In this way, sentiment analysis platform 220 may cause the action to be performed based on the prediction.

In some implementations, sentiment analysis platform 220 may identify insights based on the complaint information, the historical information, the opinion information, the prediction information, the transaction information, and/or the like. An insight may include any information that provides links between concepts, information that provides an understanding of a true nature of the complaint information, the historical information, the opinion information, the prediction information, the transaction information, and/or the like. In some implementations, sentiment analysis platform 220 may provide other predictions, such as a prediction about consumer buying behavior, a prediction about company partnerships, a prediction about which companies will develop which innovations first, a prediction about which industries will be replaced by technologies, a prediction about political trends and partnerships, a prediction about content filters (e.g., filtering articles by perspective or other communication objects), and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein may provide a sentiment analysis platform that utilizes artificial intelligence to make a prediction about an entity based on user sentiment and transaction history. For example, the sentiment analysis platform may consider sentiments of users who have opinions, complaints, and predictions about the entity, and transactions conducted by users with the entities in order to predict a future stock price of the entity. The sentiment analysis platform may receive the opinions, the complaints, and the predictions of the users, about the entity, from social media sources, and may receive transaction information associated with the users and the entity from financial institutions. The sentiment analysis platform may determine correlations between the transaction information and the opinions, the complaints, and the predictions, in order to apply weights to the opinions, the complaints, and the predictions. The sentiment analysis platform may generate a prediction about the future stock price of the entity based on the opinions, the complaints, the predictions, the transaction information, and the correlations between the transaction information and the opinions, the complaints, and the predictions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, comment information associated with a plurality of users and relating to an entity;
   generating, by the device, a plurality of interim scores associated with the entity via artificial intelligence based upon the comment information;
   receiving, by the device, transaction information associated with one or more of the plurality of users,
   the transaction information relating to the entity;
   determining, by the device, correlations between the plurality of interim scores associated with the comment information and the transaction information by using at least one of:
   a correlation clustering method,
   a Pearson's product-moment coefficient method,
   an Anscombe's quartet method, or
   a Spearman's rank-correlation coefficient method;
   applying, by the device, weights to the plurality of interim scores based upon the correlations;
   generating, by the device, a prediction about a future stock price of the entity based on the weighted plurality of interim scores;
   storing, in a relational database to reduce redundancy, the weighted plurality of interim scores and the transaction information,
   the relational database being organized in columns and tables via a data normalization method; and
   causing, by the device, an action to be taken based on the prediction about the future stock price of the entity,
   the action including one or more of:
   automatically providing, to a client device, a notification indicating the future stock price of the entity,
   automatically sending an instruction to a server to buy or sell a stock associated with the entity, or
   automatically causing a calculation of a future value of a financial portfolio to be generated.

2. The method of claim 1, further comprising:
   storing prediction information associated with the prediction in the relational database.

3. The method of claim 1, wherein the plurality of interim scores include at least one of:
   a necessity score,
   an abstract score,
   an ethics score,
   an industry score,
   a demand for service score,
   a supply for service score,
   a vendor score,
   an innovation score,
   an adaptability score, or
   an execution score.

4. The method of claim 1, wherein the comment information includes one or more of:
   complaint information relating to the entity,
   the complaint information including information indicating:
   a negative statement about the entity,
   a switch from the entity to another entity, or
   an invalidation of a product or service of the entity,
   opinion information relating to the entity,
   the opinion information including information indicating:
   a feeling about the entity,
   an opinion about the entity, or
   an expression that the entity lacks innovation, or
   prediction information relating to the entity,
   the prediction information including information indicating:
   a prediction about the entity, or
   a prospective statement about the entity.

5. The method of claim 1, further comprising:
   receiving historical information associated with the entity; and
   utilizing artificial intelligence to calculate the plurality of interim scores for the entity based on the historical information and the comment information.

6. The method of claim 1, wherein the comment information is received from one or more social media sources.

7. The method of claim 1, wherein the transaction information is received from:

a plurality of financial institutions, or
the one or more of the plurality of users.

8. A device, comprising:
one or more memories; and
one or more processors communicatively coupled to the one or more memories, configured to:
receive comment information associated with a plurality of users and relating to an entity;
generate a plurality of interim scores associated with the entity via artificial intelligence based upon the comment information;
receive transaction information associated with one or more of the plurality of users,
the transaction information relating to the entity;
determine correlations between the plurality of interim scores associated with the comment information and the transaction information;
generate a prediction about a future stock price of the entity based on the plurality of interim scores;
store, in a relational database to reduce redundancy, the plurality of interim scores and the transaction information,
the relational database being organized in columns and tables via a data normalization method; and
cause an action to be taken based on the prediction about the future stock price of the entity,
the action including one or more of:
automatically provide, to a client device, a notification indicating the future stock price of the entity,
automatically send an instruction to a server to buy or sell a stock associated with the entity, or
automatically cause a calculation of a future value of a financial portfolio to be generated.

9. The device of claim 8, wherein the one or more processors are further configured to:
store prediction information associated with the prediction in the relational database.

10. The device of claim 8, wherein the one or more processors are further to:
apply weights to the plurality of interim scores; and
generate a prediction about a future stock price of the entity based on the weighted plurality of interim scores.

11. The device of claim 8, wherein the comment information includes one or more of:
complaint information relating to the entity,
the complaint information including information indicating:
a negative statement about the entity,
a switch from the entity to another entity, or
an invalidation of a product or service of the entity,
opinion information relating to the entity,
the opinion information including information indicating:
a feeling about the entity,
an opinion about the entity, or
an expression that the entity lacks innovation, or
prediction information relating to the entity,
the prediction information including information indicating:
a prediction about the entity, or
a prospective statement about the entity.

12. The device of claim 8, wherein the one or more processors are further configured to:
receive historical information associated with the entity; and
utilize artificial intelligence to calculate the plurality of interim scores for the entity based on the historical information and the comment information.

13. The device of claim 8, wherein the comment information is received from one or more social media sources.

14. The device of claim 8, wherein the transaction information is received from:
a plurality of financial institutions, or
the one or more of the plurality of users.

15. A non-transitory computer-readable medium storing instructions, the instructions comprising:
one or more instructions that, when executed by one or more processors, cause the one or more processors to:
receive historical information associated with an entity;
receive comment information associated with a plurality of users and relating to the entity;
receive transaction information associated with one or more of the plurality of users,
the transaction information relating to the entity;
utilize artificial intelligence to calculate a plurality of interim scores for the entity based on the historical information and the comment information;
determine correlations between the plurality of interim scores associated with the comment information and the transaction information by using at least one of:
a correlation clustering method,
a Pearson's product-moment coefficient method,
an Anscombe's quartet method, or
a Spearman's rank-correlation coefficient method;
apply weights to the plurality of interim scores based upon the correlations;
generate a prediction about a future stock price of the entity based on the weighted plurality of interim scores;
store, in a relational database to reduce redundancy, the weighted plurality of interim scores and the transaction information,
the relational database being organized in columns and tables via a data normalization method; and
cause an action to be taken based on the prediction about the future stock price of the entity,
the action including one or more of:
automatically provide, to a client device, a notification indicating the future stock price of the entity,
automatically send an instruction to a server to buy or sell a stock associated with the entity, or
automatically cause a calculation of a future value of a financial portfolio to be generated.

16. The non-transitory computer-readable medium of claim 15, wherein the one or more instructions, when executed by the one or more processors, further cause the one or more processors to:
store prediction information associated with the prediction in the relational database.

17. The non-transitory computer-readable medium of claim 15, where the comment information includes one or more of:
complaint information relating to the entity,
the complaint information including information indicating:
a negative statement about the entity,
a switch from the entity to another entity, or
an invalidation of a product or service of the entity,
opinion information relating to the entity,
the opinion information including information indicating:

a feeling about the entity, an opinion about the entity, or an expression that the entity lacks innovation, or prediction information relating to the entity, the prediction information including information indicating:

a prediction about the entity, or a prospective statement about the entity.

18. The non-transitory computer-readable medium of claim 15, wherein the one or more instructions, when executed by the one or more processors, further cause the one or more processors to:

generate a combined score based on the plurality of weighted interim scores; and generate the prediction about the future stock price of the entity based on the combined score.

19. The non-transitory computer-readable medium of claim 15, wherein the plurality of interim scores include at least one of:

a necessity score, an abstract score, an ethics score, an industry score, a demand for service score, a supply for service score, a vendor score, an innovation score, an adaptability score, or an execution score.

20. The non-transitory computer-readable medium of claim 15, wherein the comment information is received from one or more social media sources.

\* \* \* \* \*